United States Patent [19]
Lavelle et al.

[11] Patent Number: 4,966,182
[45] Date of Patent: Oct. 30, 1990

[54] METHOD AND APPARATUS FOR DE-GELLING A LIQUID MIXTURE

[75] Inventors: Grant E. Lavelle, Wood Haven; Charles Rossio, Carleton; Dwight Davis, Detriot, all of Mich.

[73] Assignee: Diversey Corporation, Wyandotte, Mich.

[21] Appl. No.: 286,335

[22] Filed: Dec. 19, 1988

[51] Int. Cl.⁵ .............................................. F01M 1/00
[52] U.S. Cl. ........................................ 137/1; 137/542; 366/336
[58] Field of Search .................... 137/13, 1, 542; 366/336, 342, 176; 138/42

[56] References Cited
U.S. PATENT DOCUMENTS 2,909,192 10/1959 Dobrick .............................. 137/542
2,930,401 3/1960 Cowan ...................... 137/543.21 X
3,280,941 10/1966 Fischer .............................. 137/93 X
4,262,776 4/1981 Wilson .............................. 137/93 X Primary Examiner—Alan Cohan
Attorney, Agent, or Firm—Weintraub, DuRoss & Brady

[57] ABSTRACT

An apparatus for de-gelling a liquid mixture in accordance with the present invention includes a device interposed in the flow of the solution for agitating the solution, the agitation sufficient to substantially de-gel the solution. The device for agitating may include a valve which has a chattering motion on opening and closing to agitate the solution; a bead chamber containing closely packed beads through which the solution must pass to reach an outlet, or both the valve and bead chamber.

9 Claims, 3 Drawing Sheets

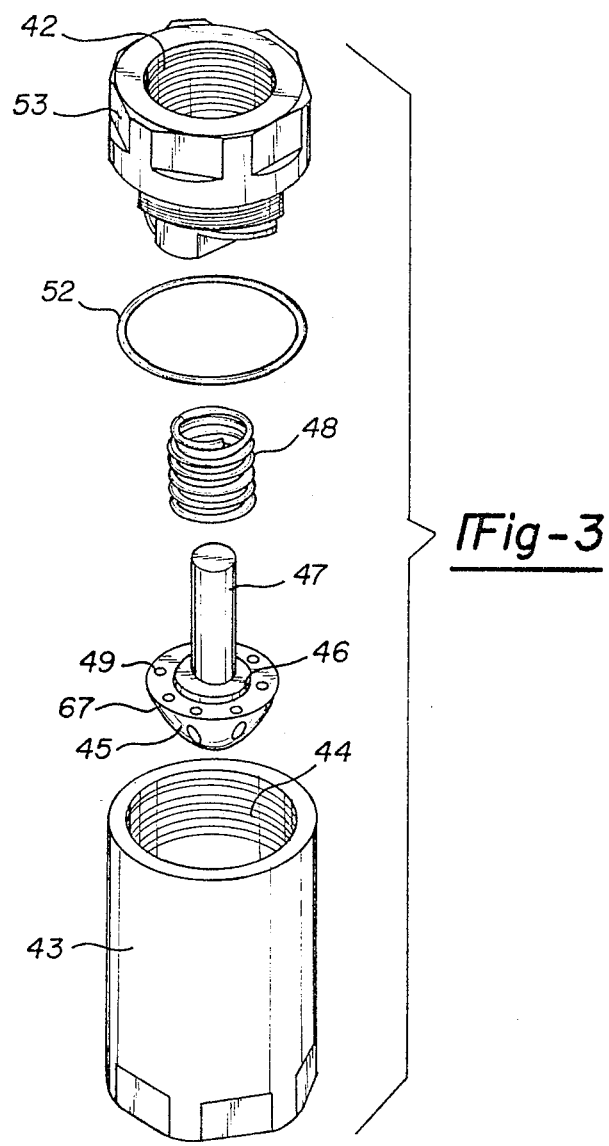
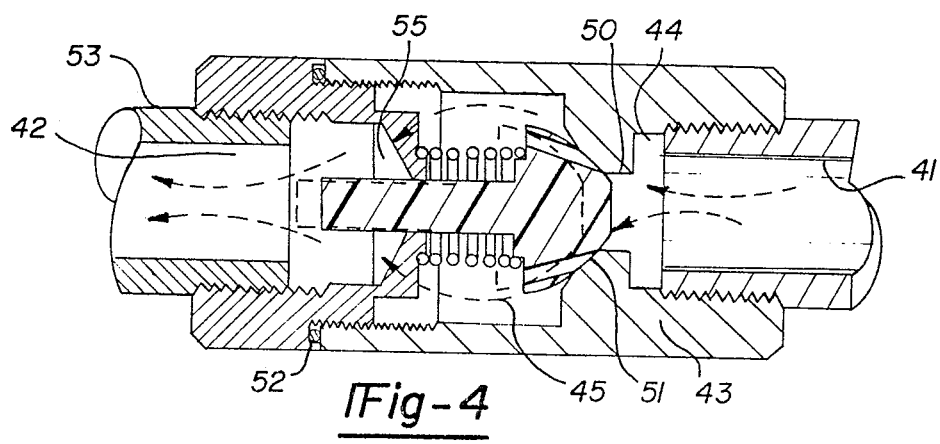

METHOD AND APPARATUS FOR DE-GELLING A LIQUID MIXTURE

BACKGROUND OF THE INVENTION

1. Field of the Invention

The present invention relates to a method and apparatus for de-gelling a liquid mixture. More particularly, the present invention relates to such a method and apparatus for use in a fluid feed system after a point at which two components are combined, the combination producing a gel. The present invention provides a means for de-gelling the solution in order for the liquid to flow more readily.

2. Description of the Prior Art

In industrial processes sometimes when a liquid is mixed with a solid or another liquid, the combination of the components causes a gel to form. Subsequent handling of the solution in a particular application may be hindered or rendered difficult by this gel state. Transport of the gel solution is somewhat difficult using conventional pumps and equipment, especially if the gel is viscous and accumulates on the equipment.

In particular, in the practice of mixing a concentrated soap solution with water for use as a lubricant on a chain conveyor system, the use of soaps containing long-chain or "tall" fatty acids or the anions thereof, when added to water, often results in gelling of the resulting solution. This creates a viscous lubricant which does not flow readily and is somewhat difficult to transport and work with in an industrial application.

Wilson et al, U.S. Pat. No. 4,262,776, discloses a conveyor lubricating system for applying a multi-ingredient lubricant composition to a conveyor. In the system of Wilson, separate pumps are provided for each component in the composition as well as separate controllers for the pumps. This allows the mix of the composition to be varied according to the needs of the user.

Fischer, U.S. Pat. No. 3,280,941, discloses a compact central lubrication system for use with machinery which includes a progressively advancing chain conveyor system. Fischer discloses a cabinet having a mixing tank in which a diluent is mixed with a concentrated soap supply to form a lubricant solution for use with a conveyor. Automatic controls are provided to prevent overflow of the mixing tank and to provide flow of lubricant to a conveyor.

SUMMARY OF THE INVENTION

The present invention provides a valve for de-gelling a liquid mixture, comprising:

a main body having an inlet and an outlet; and a fluid passage therethrough connecting the inlet to the outlet for fluid flow therebetween;

means in the fluid passage for resisting the flow of fluid therethrough; and means for biasing the flow resisting means towards the inlet.

The valve of the present invention may include a reduced diameter seat in the fluid passage and the means for resisting flow may include a stopper engagable with the seat to substantially reduce fluid flow therepast.

The present invention, also, encompasses a multiple component liquid lubricant delivery system for delivering a liquid solution containing a lubricant concentrate and a diluent to a conveyor means for lubrication thereof. The delivery system includes apparatus for de-gelling the solution, comprising means interposed the flow of the solution for agitating the solution, the agitation being sufficient to substantially de-gel the solution. The means for agitating may include the valve herein described, and/or may include a bead chamber having an inlet and an outlet and containing closely packed beads. The beads are interposed the inlet and the outlet so that the solution must pass between and among the beads to pass from the chamber inlet to the chamber outlet. The beads of the bead chamber may be glass, and may have a rough surface on the outside thereof.

The present invention also encompasses a method of de-gelling a liquid mixture, which may include passing substantially all of the mixture to be de-gelled through a bead chamber as herein described, passing substantially all of the mixture to be de-gelled through a valve as herein described, or both.

BRIEF DESCRIPTION OF THE DRAWINGS

FIG. 3 is an exploded perspective view of the valve of FIG. 2.

FIG. 4 is a cross-sectional plan view of the valve of FIG. 2.

DETAILED DESCRIPTION OF THE PREFERRED EMBODIMENT

Figure 1:
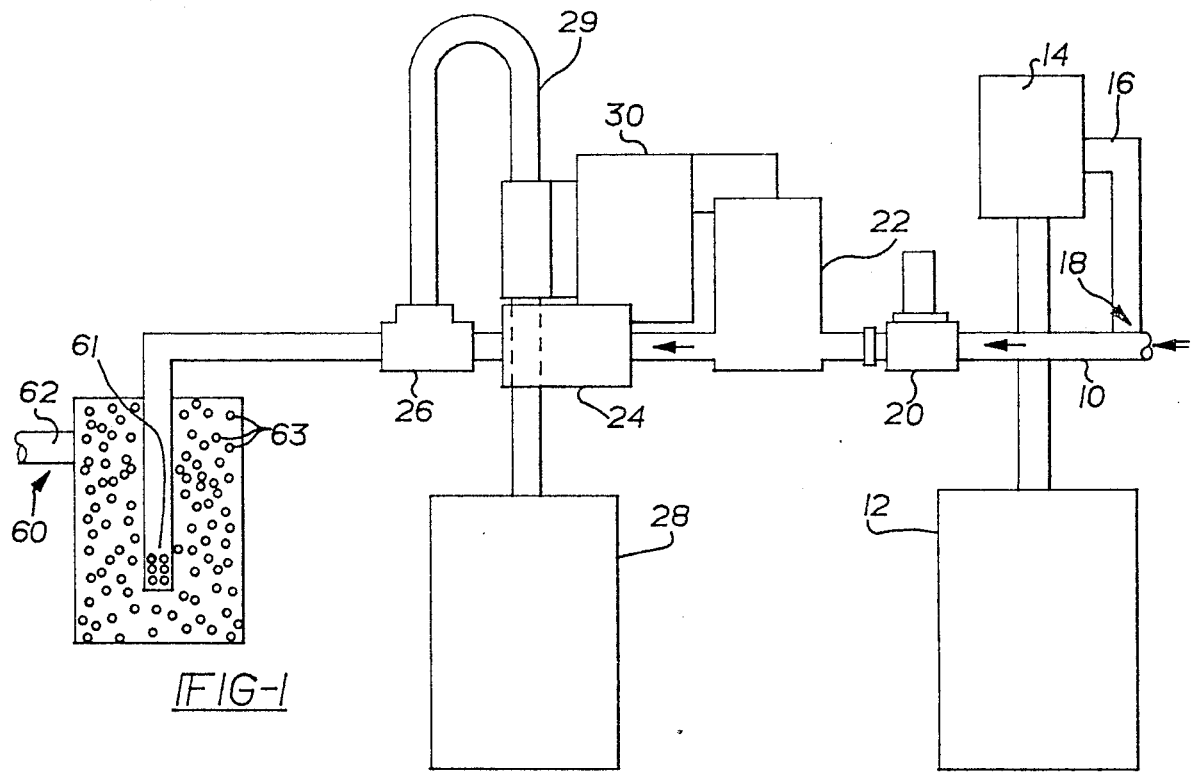
FIG. 1 is a generalized diagram of a lubricant delivery system incorporating the bead chamber of the present invention.

Throughout the following description and in the drawings, identical reference numbers are used to refer to the same component shown in multiple figures of the drawings.

Figure 2:
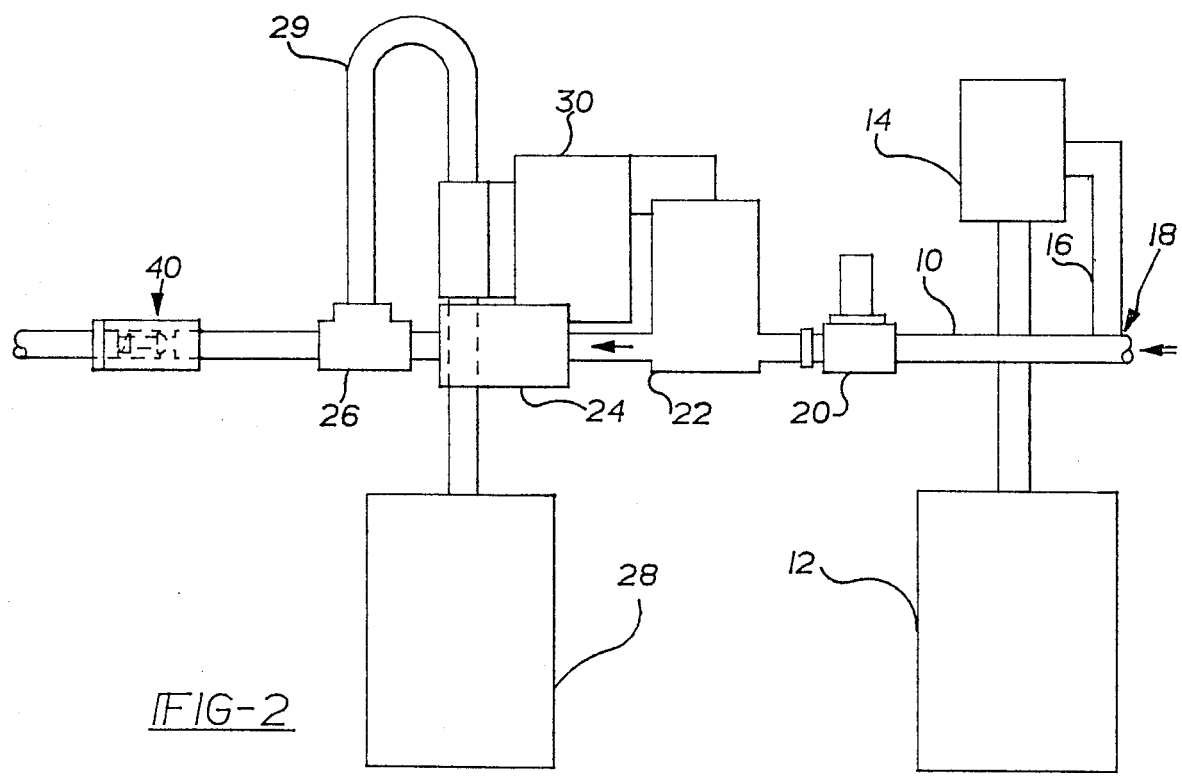
FIG. 2 is a generalized diagram of a lubricant delivery system incorporating the valve of the present invention.
Figure 5:
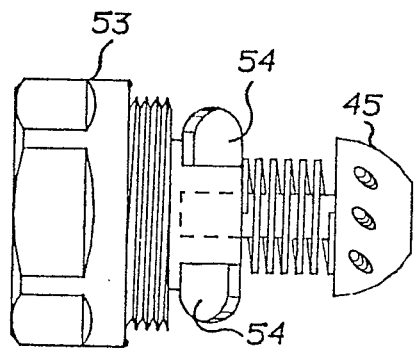
FIGS. 5 and 6 are side plan views of a stopper and baffle assembly of the valve of FIG. 3, FIG. 6 showing the assembly rotated 90° about its axis from the view of FIG. 5.
Figure 6:
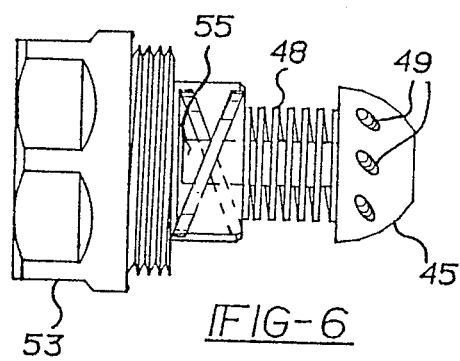
Figure 7:
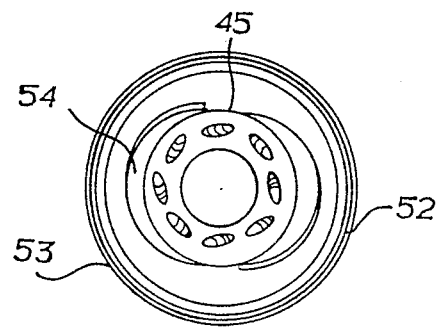
FIG. 7 is a top plan view of the stopper and baffle assembly of FIGS. 5 and 6.

Referring to FIGS. 1 and 2, a lubricant delivery system is shown in part, in which a diluent, such as water, is flowing under pressure in a line 10. A reservoir 12 containing a first component to be added to the diluent is pumped by a first pump 14 through a pipe 16 to enter the line 10 at a junction 18. Pressure in the line 10 downstream from the junction 18 is regulated by a pressure regulator 20 and the solution then flows to a mixing chamber 22.

A second pump 24 keeps the solution moving after it exits the mixing chamber 22 to flow through a second junction 26. A second additive, such as a high solid soap based lubricant is stored in a second reservoir 28. A precision metering pump 30 pumps the second additive through a pipe 29 and also measures the amount of the second additive to be added to the solution at the second junction 26. The addition of "tall" or long-chained fatty acids or the anions thereof to form a soap-based aqueous lubricant often results in gellation of the solution. The present invention would have particular utility with a lubricant solution such as, e.g., that disclosed in U.S. Pat. application Ser. No. 218,893 which is assigned to the assignee of the present invention. Gellation would in FIG. 1 take place immediately after addition of the second additive at the second junction 26 in the line 10.

In the system for delivering a liquid solution containing a lubricant concentrate and a diluent to a conveyor means for lubrication thereof which is shown in FIGS. 1 and 2, each of the two figures shows an apparatus for de-gelling the solution, comprising means interposed in the flow of the solution for agitating the solution, the agitation being sufficient to substantially de-gel the solution. Referring specifically to FIGS. 2, 3, and 4, the means for agitating shown in these figures is a de-gelling valve 40 which includes a main body 43 having an inlet 41, an outlet 42, and a fluid passage 44 therethrough connecting the inlet to the outlet for fluid flow therebetween. A stopper 45 is used as a means in the fluid passage for resisting the flow therethrough in the embodiment shown. The stopper 45 has a shaft portion 47 integral thereto, and has a generally hemispheric plug portion 67 with a spring seat 46 surrounding the shaft 47 at the point where it joins the plug portion 67 of the stopper 45. A spring 48 seats on the spring seat 46 and acts in the valve 40 as a means for biasing the stopper 45 towards the inlet 41 to seat the plug portion 67 in the seat 46. In one embodiment, the plug portion 67 may have holes 49 formed around the circumference thereof to allow better fluid flow through the valve 40 when it is partially open.

Referring particularly to FIG. 4, it will be seen that the fluid flow passage 44 includes a reduced diameter portion 50 having a chamfered seat 51 formed therein in which the stopper 45 is engagable to substantially reduce flow of fluid therepast. Once the stopper 45 is seated in the seat 51, the fluid pressure at the inlet 41 builds until it overcomes the force of the spring 48 and unseats the stopper 45 from the seat 51, moving it to the left as shown in phantom in FIG. 4. Once the mixture is allowed to flow past the stopper 45 and through the holes 49 in the embodiment shown, the pressure at the inlet 41 rapidly drops off until it is less than the opposing pressure of the spring 48, which then re-seats the stopper 45 in the seat 51. A "chattering" motion of the valve is thus caused by the opposing forces of the spring 48 and the fluid pressure in the line 10.

As seen in FIGS. 3–7, a baffle portion 53 of the valve is removable via a threaded attachment to the inlet portion 43 and has an O-ring 52 which fits in a slot along the circumference thereof to seal the baffle portion 53 to the inlet portion 43 of the main body. In a preferred embodiment, two baffles 54 are provided for the fluid beyond the stopper 45. As may be seen in FIG. 6, beyond the baffles 54 are openings 55 in the sides of the baffle portion 53 between the plates and the outlet to allow the fluid passage to maintain fluid flow communication through the baffle portion 53 to outlet 42. The baffles 54 are semi-circular plates which partially block flow through the fluid passage 44 but still leave space around the outer edges thereof for the passage of fluid, as may be seen in FIG. 7.

Referring now to the embodiment shown in FIG. 1, the means for agitating the solution in this embodiment is a bead chamber 60 which has a chamber inlet 61 in fluid communication with the solution line 10 and also has a chamber outlet 62 from which the de-gelled solution continues until it is applied to a conveyor means, assisted by the action of pump 24. The bead chamber 60 contains closely packed beads 63, a multiplicity of beads 63 interposed between the chamber inlet 61 and the chamber outlet 62 so that the solution must pass between and among the beads 63 to pass from the chamber inlet 61 to the chamber outlet 62. This creates sufficient agitation to substantially de-gel the solution.

In one embodiment, the lubricant delivery system may include both the valve 40 and the bead chamber 60 to ensure de-gelling of the solution. When in operation, the stopper 45 of the valve 40 moves rapidly in an oscillating fashion back and forth the left and right as shown in FIG. 4 pushed by opposing forces of the spring 48 and the pressure of the solution in the line 10. This "chattering" movement of the stopper 45 in the seat 51 agitates the mixture, the agitation sufficient to substantially de-gel the solution.

The foregoing description is intended to be illustrative, and not restrictive. The method and apparatus of the present invention may be used to de-gel various water-based mixtures other than soap-based lubricants. The valve in particular is effective to emulsify mixtures of components which are otherwise immiscible. Many modifications of the present invention will occur to those skilled in the art. All such modifications within the scope of the appended claims are intended to be within the scope and spirit of the present invention.

Having, thus, described the invention, what is claimed is:

1. A multiple component liquid lubricant delivery system for delivering a flow of a liquid solution containing a lubricant concentrate and a diluent to a conveyor means for lubrication thereof, the delivery system including an apparatus for de-gelling the solution, comprising:

means interposed the flow of the solution for agitating the solution.

the means for agitating including a valve which comprises:

a main body having an inlet and outlet and a fluid passage therethrough connecting the inlet to the outlet for fluid flow therebetween;

means in the fluid passage for resisting the flow of fluid therethrough; and means for biasing the flow resisting means towards the inlet.

2. The system of claim 1, wherein the fluid passage has a reduced diameter portion with a seat formed therein, and the flow resisting means includes a stopper engagable with the seat to substantially reduce flow of fluid therepast.

3. A multiple component liquid lubricant delivery system for delivering a flow of a liquid solution containing a lubricant concentrate and a diluent to a conveyor means for lubrication thereof, the delivery system including an apparatus for de-gelling the solution, comprising:

means interposed the flow of the solution for agitating the solution.

the means for agitating including a bead chamber having an inlet and an outlet and containing a multiplicity of closely packed beads interposed the inlet and the outlet, so that the solution must pass between and among the beads to pass from the chamber inlet to the chamber outlet.

4. The apparatus of claim 3 wherein the beads are glass and have a rough surface on the outside thereof.

5. The apparatus of claim 1, wherein the means for agitating includes a bead chamber having an inlet and an outlet and containing, a multiplicity of closely packed beads interposed the chamber inlet and the chamber outlet so that the solution must pass between and among the beads to pass from the chamber inlet to the chamber outlet.

6. A method of de-gelling a liquid mixture, comprising the step of:
passing substantially all of the mixture to be de-gelled through a bead chamber having an inlet and an outlet and containing, a multiplicity of closely packed beads being interposed the inlet and the outlet so that the mixture must pass between and among the beads to pass from the chamber inlet to the chamber outlet.

7. A method of de-gelling a liquid mixture, comprising the step of:
causing substantially all of the mixture to be de-gelled to pass through a valve, the valve comprising:
a main body having an inlet and an outlet and a fluid passage therethrough connecting the inlet to the outlet for fluid flow therebetween;
means in the fluid passage for resisting the flow of fluid therethrough; and
means for biasing the flow resisting means towards the inlet.

8. The system of claim 2, wherein the stopper within the valve comprises a shaft portion and a plug portion which fits into the seat, the plug portion being generally hemispherical in shape and having holes formed around the circumference thereof.

9. The system of claim 8, wherein the main body of the valve comprises a baffle portion and an inlet portion which threadably interengage, the inlet portion containing the inlet and the reduced diameter portion, and wherein the baffle portion comprises plates which partially block the fluid passage, leaving space around the edges thereof for the passage of fluid, the baffle portion having a hole formed coaxially therein which receives the shaft of the stopper, the baffle portion further having openings therein between the plates and the outlet to permit fluid flow therethrough.

* * * * *